United States Patent [19]
Tanaka et al.

[11] Patent Number: 5,714,601
[45] Date of Patent: Feb. 3, 1998

[54] METHOD FOR PRODUCING STARCH ESTERS, STARCH ESTERS, AND STARCH ESTER COMPOSITIONS

[75] Inventors: Hideyuki Tanaka; Isamu Utsue; Hiroshi Tanaka, all of Aichi; Yasuhito Okumura, Chiba, all of Japan

[73] Assignee: Japan Corn Starch Co., Inc., Aichi, Japan

[21] Appl. No.: 591,591

[22] PCT Filed: Oct. 30, 1995

[86] PCT No.: PCT/JP95/02218

§ 371 Date: Feb. 2, 1996

§ 102(e) Date: Feb. 2, 1996

[87] PCT Pub. No.: WO96/14342

PCT Pub. Date: May 17, 1996

[30] Foreign Application Priority Data

Nov. 8, 1994 [JP] Japan .................. 6-273679
Jun. 8, 1995 [JP] Japan .................. 7-142029

[51] Int. Cl.⁶ ................ C08B 31/02; A61K 31/715
[52] U.S. Cl. ............................ 536/107; 514/60
[58] Field of Search .......................... 536/107; 514/60

[56] References Cited

U.S. PATENT DOCUMENTS 3,795,670  3/1974  Mark et al. ................ 260/233.5
4,891,404  1/1990  Narayan et al. ............. 525/54.2
5,367,067  11/1994  Frische et al. ............. 536/45
5,462,983  10/1995  Bloembergen et al. ........ 524/51

FOREIGN PATENT DOCUMENTS

WO92/16583  10/1992  WIPO.
WO93/20110  10/1993  WIPO.
WO94/07953  4/1994  WIPO.

OTHER PUBLICATIONS

A. M. Mark and C. L. Mehltretter, Die Starke 22, Jahrg, 1970/Nr. 4 (pp. 108–110). Publication discussing the 'acetylation of high-amylose corn starch'.

A. M. Mark and C. L. Mehltretter, Die Starke 24, Jahrg, 1972/Nr. 3 (pp. 73–76). Publication discussing preparation of starch triacetates.

Journal of Applied Polymer Sciences, vol. 22, 1978 (pp. 459–465), "A New Biodegradable Plastic Made From Starch Graft Poly (methyl acrylate) Copolymer". Publication discussing grafted starch-based, biodegradable plastics.

*Primary Examiner*—John Kight
*Assistant Examiner*—Everett White
*Attorney, Agent, or Firm*—Quarles & Brady

[57] ABSTRACT

A method of preparing starch esters consists of combining starch with an esterification catalyst and then reacting the starch with a vinyl compound. The starch esters thus prepared and the compositions containing those esters have properties which are superior to the starch esters of the prior art.

4 Claims, 2 Drawing Sheets

[Fig. 1]
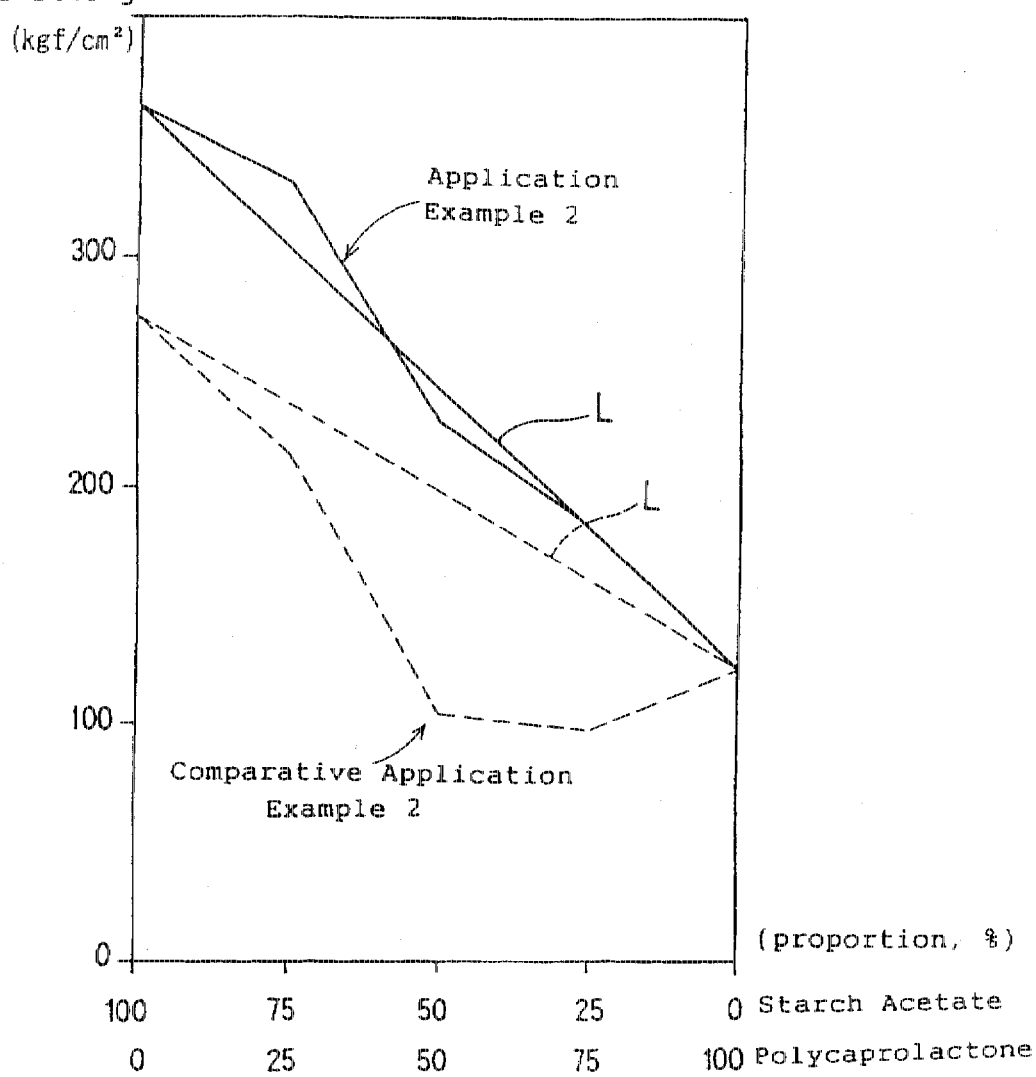

[Fig. 2]
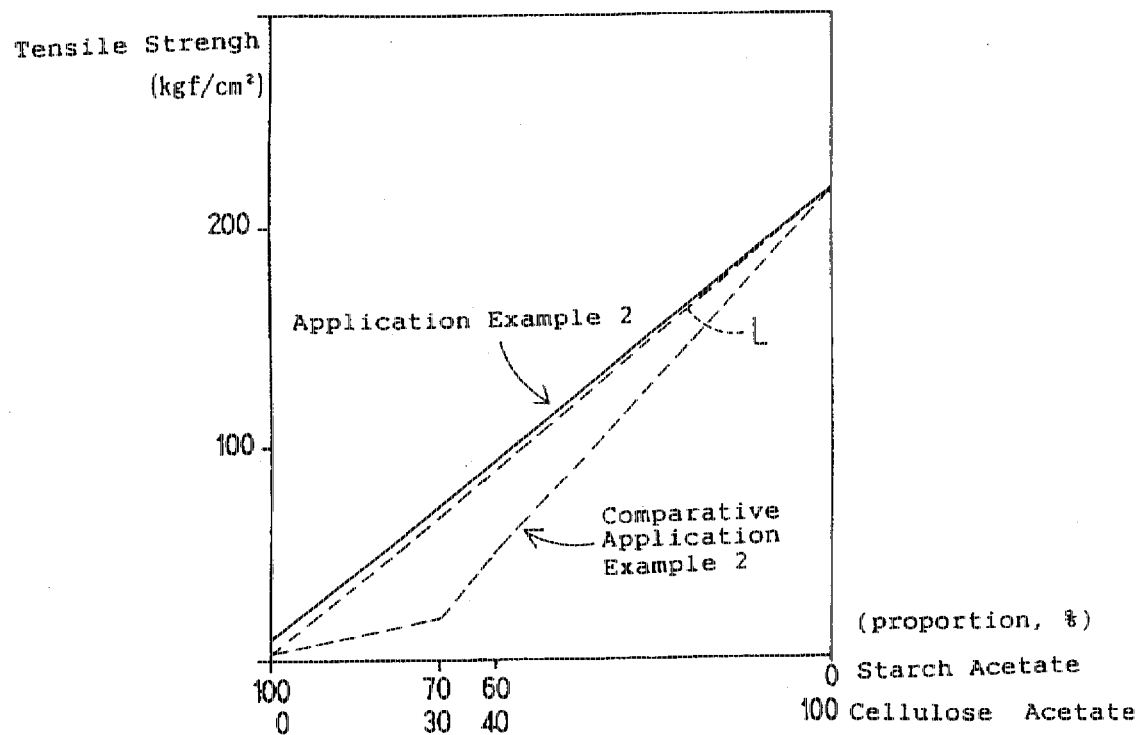

METHOD FOR PRODUCING STARCH ESTERS, STARCH ESTERS, AND STARCH ESTER COMPOSITIONS

FIELD OF THE INVENTION

The present invention relates to a method for producing starch esters by using a vinyl ester as the esterifying agent, such starch esters, and compositions containing the starch esters. In particular, the present invention relates to a method for producing water-proof starch esters having a high degree of substitution, a high molecular weight and a high mechanical strength, such starch esters, and starch ester compositions.

BACKGROUND OF THE INVENTION

As a synthetic reaction favorable for obtaining starch esters having a low degree of substitution (DS is not larger than 1.0), known is a method of using vinyl acetate as the esterifying agent in an aqueous slurry phase. (See "Handbook of Starch Science", 1st Edition, 1st Print, page 505, published by Asakura Shoten Co., July 1977.)

On the other hand, as a synthetic reaction favorable for obtaining starch esters having a high degree of substitution, known is a method of reacting an acid anhydride and a starch in pyridine in the presence of a catalyst of dimethylaminopyridine or an alkali metal salt. (See "Starch Chemistry & Technology", page 332 to 336, written by Whistler and published by Academic Press.)

As another means of producing starch esters with a high degree of substitution, known is a method of reacting a starch in an acid anhydride at a temperature not lower than 100° C. with an aqueous solution of an alkali metal hydroxide as the catalyst, followed by purifying the resulting ester with an alcohol, as well as the starch ester thus produced. (See Japanese Patent Laid-Open No. 5-508185.) In this laid-open application, referred to is a composition comprising the starch ester produced therein and a plasticizer having an effect specific to the starch ester (the effect is for causing the gellation with the starch ester).

As still another means of producing starch esters with a high degree of substitution, known is a method disclosed by A. M. Mark and C. L. Mehltretter in academic journal of "Die Starke" (March number, page 73, 1972), which is extremely similar to the method disclosed in Japanese Patent Laid-Open No. 5-508185.

However, in the above-mentioned methods for producing starch esters with a high degree of substitution, the effective utilization of the esterifying agents is low or about 40%, and the glycoside bonds (essentially, alpha-1-4 bond) in the starch esters produced are hydrolyzed by the organic acid to be produced as side products and a small amount of water existing in the diluting solvent or water to be added to the reaction system along with the catalyst to give low-molecular starch esters. Even if the formation of such low-molecular starch esters could be prevented as much as possible by some means, it is still impossible to realize the intended stoichiometrical increase in the molecular weight of the starch ester to be produced than the molecular weight of the starting starch.

For the purpose of preventing the formation of low-molecular starch esters by hydrolysis, there is known a means of previously adding an alkaline salt such as sodium bicarbonate or the like to the reaction solvent. Even by this means, the molecular weight of the starch esters to be produced is lowered to about ⅓. Therefore, this means is not so effective.

The starch esters produced by the above-mentioned known methods (such as methods for producing starch esters disclosed in Japanese Patent Laid-Open No. 5-508185 or by A. M. Mark and C. L. Mehltretter, etc.) could be shaped into starch derivative moldings which are fairly good in terms of the water-proofness and the mechanical and physical properties. In practice, however, starch derivative moldings which satisfy the following requirements are desired.

(1) Starch derivative moldings having more increased mechanical strength and more improved physical properties.

(2) Starch derivative moldings having more lowered water (or steam) sensitivity. (In other words, starch derivative moldings whose mechanical and physical properties are influenced little by water or moisture in air.)

(3) Starch derivative moldings capable of being produced at lower costs.

With respect to the point (3), the reduction in the production costs was limited in prior art because of the low effective utilization of the esterifying agents to be used.

When the starch esters with a high degree of substitution produced by the conventional method (where aliphatic acid anhydride or aliphatic acid halides are used) are blended with biodegradable polyesters, polyvinyl alcohols (PVAL), polyvinyl acetates (PVAC), cellulose acetates, etc., the mechanical properties of the moldings to be formed out of the blends could be improved in some degree. However, when the change in the mechanical strength of the moldings shaped out of only a starch ester and that of the moldings shaped out of only a resin that is represented by the straight line formed by linking the point of the mechanical strength of the former with the point of the mechanical strength of the latter is compared with the change in the mechanical strength of moldings shaped out of blends of the starch ester and the resin at different blending ratios, the latter is drawn lower than the former (see Application Example 2 and Comparative Application Example 2). This is considered because of the poor compatibility between the starch ester produced by the conventional method and the resin. Though not clarified as yet at present, the reason why the starch ester and the resin have such different compatibility may be considered because of the intrinsic difference in the molecular structure of the starch ester or, that is, the difference in the molecular weight of the starch ester and the intramolecular distribution of the substituted ester residues in the starch ester, the poor compatibility between the starch ester and the plasticizer, the maximum amount of the plasticizer to be applicable to the starch ester, the difference in the shearing viscosity between the starch ester and the plasticizer to be influenced by the molecular weight of the starch ester and the maximum amount of the plasticizer to be applicable to the starch ester, etc. In this technical field, it has been strongly desired to realize water-proof, biodegradable and thermoplastic starch esters or starch derivatives capable of being shaped into moldings whose mechanical and physical properties are not lowered or are lowered only slightly.

SUMMARY OF THE INVENTION

The method for producing starch esters and the starch esters produced by the method of the present invention are characterized in that a vinyl ester where the ester residue has from 2 to 18 carbon atoms is used as the esterifying agent and this is reacted with a starch in a non-aqueous organic solvent in the presence of an esterification catalyst, as described in detail hereinafter. The starch ester compositions of the present invention are characterized by consisting essentially of the starch ester and at least one or more ester-type plasticizers having high compatibility with the ester, also as described in hereinafter. The present invention comprising these constitutions exhibits the following effects, as will be supported by the examples and the comparative examples mentioned hereinunder.

1) The effective utilization of the esterifying agent is 50% or more.

2) The starch ester compositions of the invention may be shaped into moldings having much higher mechanical strength than the moldings to be shaped out of conventional starch ester compositions. This is considered because the starch esters of the present invention can have an extremely high molecular weight, which the starch esters to be produced by the conventional methods could not have, or that is, the molecular weight of the starch esters of the present invention is surely increased than that of the starting starches (unmodified starches, lightly-modified starches) due to the esterification, surprisingly although the degree of substitution of the starch esters is high.

3) In addition, as being quite different from the starch esters produced by the conventional methods, the starch esters produced by the method of the present invention have good compatibility with synthetic resins and plasticizers. Therefore, when the starch esters of the present invention are combined with synthetic resins and plasticizers such as those mentioned hereinabove and shaped into moldings, the moldings have noticeably increased mechanical strength correspondingly to the blending ratios of the components or have much more increased mechanical strength than the mechanical strength to be anticipated from the blending ratios. From these, it can be said that the starch esters of the present invention are novel and are different from the starch esters to be produced by the conventional methods in terms of the molecular characteristics and the molecular structures.

When the vinyl ester used as the esterifying agent acts also as the reaction medium (reaction solvent) in the present invention, any particular step of withdrawing the solvent from the reaction product is unnecessary and the formation of low-molecular products is much retarded.

BRIEF DESCRIPTION OF THE DRAWINGS

FIG. 1. This is a graph showing the relationship between the blending ratio of starch ester/polycaprolactone and the tensile strength.

FIG. 2. This is a graph showing the relationship between the blending ratio of starch ester/cellulose acetate and the tensile strength.

DETAILED DESCRIPTION OF THE INVENTION

The means of the present invention are described in detail hereinunder. Unless otherwise specifically indicated, the units for the formulations referred to hereinunder are by weight.

(1) The starting starch to be esterified to an esterified starch includes (i) unmodified starches from terrestrial stems, such as corn starch, high-amylose corn starch, wheat starch, etc., (ii) unmodified starches from subterranean stems such as potato starch, tapioca starch, etc., (iii) modified starches to be obtained by low-degree esterification, etherification, oxidation, acid treatment or dextrination of such starches, etc. These are used singly or as their combinations.

(2) The vinyl ester to be used as the esterifying agent is such that its ester residue has from 2 to 18 carbon atoms, preferably from 2 to 7 carbon atoms. This is used singly or as combinations of two or more. Vinyl esters where the ester residue has more than 18 carbon atoms are unfavorable since the reaction efficiency with them is lowered, although their effective utilization is high. It is preferable that the ester residue in the vinyl ester has from 2 to 7 carbon atoms, since the reaction efficiency with the ester is kept on a high level (at 70% or more).

Concretely, the following esters are exemplified (where the parenthesized number indicates the number of the carbon atoms constituting the ester residue). Of these, vinyl acetate and vinyl propionate are especially preferred as being able to attain high reaction efficiency.

(i) Vinyl esters of saturated aliphatic carboxylic acid such as vinyl acetate (C2), vinyl propionate (C3), vinyl butanoate (C4), vinyl caproate (C6), vinyl caprylate (C8), vinyl laurate (C12), vinyl palmitate (C16), vinyl stearate (C18), etc.; or vinyl esters of unsaturated aliphatic acids such as vinyl acrylate (C3), vinyl crotonate (C4), vinyl isocrotonate (C4), vinyl oleate (C18), etc.

(ii) Also usable are vinyl esters of aromatic carboxylic acids such as vinyl benzoate, vinyl p-methylbenzoate, etc.

(3) As one embodiment of the non-aqueous organic solvent, the vinyl ester is used as the organic solvent.

In this embodiment, any particular step for withdrawing the solvent from the reaction product for the purification of the product is unnecessary. For the esterification with conventional vinyl esters, the reaction system of this type has not been employed.

This embodiment is preferred since the formation of low-molecular starch esters is prevented and the reaction efficiency with the vinyl ester is improved. However, the vinyl ester employable in this embodiment is limited to only a liquid one (including a hot-melted one), and the reaction with the vinyl ester is often somewhat non-uniform.

As examples of the vinyl ester employable in this embodiment, referred to are those mentioned hereinabove.

(4) In another embodiment of the non-aqueous organic solvent, the reaction agent, vinyl ester is not used or cannot be used as the non-aqueous organic solvent.

This embodiment where a non-aqueous organic solvent except the vinyl ester is used more convenient than the previous embodiment where the vinyl ester is used as the organic solvent, since the concentration of the reaction solution and the reaction speed can be more easily controlled irrespective of the kind of the vinyl ester used and since the reaction proceeds more uniformly. However, this embodiment requires the step for separating and withdrawing the solvent from the vinyl ester.

As the non-aqueous organic solvent to be employed in this embodiment, mentioned are (i) polar solvents which dissolve starches, such as dimethylsulfoxide (DMSO), dimethylformamide (DMF), pyridine, etc.; or (ii) polar solvents which do not dissolve starches but dissolve (or are compatible with) vinyl esters and esterified starches produced (but are not reactive with vinyl esters), such as ethyl acetate, acetone, etc. These solvents are used singly or as their combinations.

In particular, preferred are starch-dissolving non-aqueous organic solvents such as DMSO, DMF, pyridine, etc., in view of the reaction efficiency and the reaction uniformity.

(5) The esterification catalyst can be selected from the groups of (i) hydroxides and/or mineral acid salts or organic acid salts or carbonates of any metals selected among alkali metals, alkaline-earth metals and amphoteric metals, (ii)

organic interlayer transition catalysts and (iii) amino compounds, such as those exemplified below. Of these, (i) are preferred in view of the reaction efficiency with them and their costs.

(i) Alkali metal hydroxides such as sodium hydroxide, potassium hydroxide, lithium hydroxide, etc.; salts of organic acids and alkali metals such as sodium acetate, sodium propionate, sodium p-toluenesulfonate, etc.; alkaline-earth metal hydroxides such as barium hydroxide, calcium hydroxide, etc.; salts of organic acids and alkaline-earth metals such as calcium acetate, calcium propionate, barium p-toluenesulfonate, etc.; salts of mineral acids such as sodium phosphate, calcium phosphate, sodium bisulfite, sodium bicarbonate, potassium sulfate, etc.,; acidic salts or hydroxides of amphoteric metals, such as sodium aluminate, potassium zincate, aluminum hydroxide, zinc hydroxide, etc.; carbonates such as sodium carbonate, potassium bicarbonate, etc.

(ii) Amino compounds such as dimethylaminopyridine, dimethylaminoacetic acid, etc.

(iii) Quaternary ammonium compounds such as N-trimethyl-N-propylammonium chloride, N-tetraethylammonium chloride, etc.

(6) It is desirable that the above-mentioned catalyst is previously infiltrated into the starting starch prior to its esterification, if the esterifying agent, vinyl ester is used as the solvent or if a non-aqueous solvent which does not dissolve the starch is used as the solvent, since the reaction efficiency for the esterification is improved.

As the pre-treating means of infiltrating the catalyst into the starting starch, employable are various infiltrating methods, such as a method of dipping the starch in an aqueous solution or a solvent containing the catalyst, a method of blending the starch with an aqueous solution or a solvent containing the catalyst in a blending means such as a kneader, etc., a method of alphatizing the starch in an aqueous solution or a solvent containing the catalyst in a starch-alphatizing device such as a drum drier, etc., a method of gelatinizing the starch in an aqueous solution or a solvent containing the catalyst in a batch cooker or a continuous cooker thereby infiltrating the catalyst into the starch, etc.

(7) The reaction temperature conditions for the present invention are not specifically defined but, in general, the reaction is conducted at 30° to 200° C., desirably at 60° to 150° C., in view of the reaction efficiency.

For the conventional reaction using acid anhydrides, the reaction temperatures were controlled at 40° C. or lower for the purpose of preventing the formation of low-molecular starch derivatives by hydrolysis. However, since the reaction using vinyl esters does not give acids as side products, it can be conducted at higher temperatures and therefore the reaction efficiency can be increased.

The amount of the vinyl ester to be used shall be from 1 to 20 molar times, more preferably from 3 to 7 molar times, relative to one mole of the starting starch.

The amount of the esterification catalyst shall be, in general, from 1 to 30% by weight relative to the starting starch.

(8) Various plasticizers (essentially ester-type ones) which are highly compatible with starch esters, such as those mentioned below, can be used in the present invention.

Phthalate-type plasticizers:

Phthalates such as dimethyl, diethyl or dibutyl phthalate, etc., and ethylphthaloylethyl glycolate, butylphthaloylbutyl glycolate, etc.

Fatty acid ester-type plasticizers:

Methyl, ethyl, butyl or isopropyl oleate, adipate or stearate, etc.

Polyalcohol ester-type plasticizers:

Sucrose acetate, diethylene glycol dibenzoate, triacetin (triacetylglycerin), tripropionin (tripropyonylglycerin), acetyldiglycerin, etc.

Hydroxyl acid ester-type plasticizers:

Methyl acetylricinolate, triethyl acetylcitrate, etc.

Phosphate-type plasticizers:

Tributyl phosphate, triphenyl phosphate, etc.

Epoxy plasticizers:

Epoxidated soy bean oil, epoxidated castor oil, alkylepoxystearates, etc.

Polymer-type plasticizers:

Various liquid rubbers, terpenes, linear polyesters, etc.

Of these, especially preferred are ester-type plasticizers such as triethyl acetylcitrate (ATEC), ethylphthaloylethyl glycorate (EPEG), triacetin (TA), tripropionin (TP), etc. This is because TA and TP have high compatibility with starch esters and have high resin transparency and because ATEC and EPEG have high compatibility with starch esters and, in addition, when these are added to starch esters, the resulting blends can have extremely elevated mechanical strength.

(9) Various fillers such as those mentioned below may be added to the starch ester composition when the compositions are shaped into moldings.

Inorganic fillers:

Talc, titanium oxide, clay, chalk, limestone, calcium carbonate, mica, glass, diatomaceous earth, wollastonite, various silica salts, various magnesium salts, various manganese salts, etc.

Organic fillers:

Starches (including starch derivatives), cellulose fibers (including cellulose derivative fibers), cellulose powders (including cellulose derivative powders), wood powder, pulp, pecan fibers, cotton powder, husks, cotton linter, wood fibers, baggasse, etc.

Synthetic fillers:

Glass fibers, urea polymers, ceramics, etc.

In particular, inorganic fillers such as talc, mica, calcium carbonate, etc., and organic fillers such as fibrous cellulose powders, cotton linter pulp, pecan fibers, etc. are preferably used. This is because of the following reasons: Talc and mica have good surface properties and do not lower the mechanical strength of starch ester moldings containing them; starch ester compositions containing calcium carbonate or the like inorganic fillers have good fluidity while they are shaped by injection molding; and fibrous celluloses and the like organic fillers are highly effective for improving the mechanical strength of shaped starch ester moldings containing them.

(10) As other natural or synthetic resins which may be added to the starch ester compositions of the present invention, for example, preferably used are those mentioned below.

As one embodiment of preparing the starch ester compositions of the present invention, employable is a method of blending the starch ester of the invention optionally with a plasticizer, then further blending it with a resin and optionally along with a filler and other additives in a Henschel mixer and thereafter kneading the resulting blend in a plasto-mill or an extruder, which, however, is not specifically limited.

Examples of the resin to be blended with the starch ester of the invention are mentioned below. The shape of the resin is not specifically defined, and the resin may be any of powder, pellet-like, flaky and granular ones.

Cellulose-type resins:

Cellulose acetate, hydroxyethyl cellulose, propyl cellulose, hydroxybutyl cellulose, etc.

Polymer-type resins:

Polycaprolactone; polylactic acid; biodegradable polyesters such as polyadipates, polyhydroxybutyrates (polyhydroxyalkanoates), polyhydroxybutyrate valerate, etc.; polyalkylene oxides such as polyethylene oxide, polypropylene oxide, etc.; PVAL and various modified PVAL's; polyacrylamide resins; polycarbonate resins; polyurethane resins; vinyl polymers such as polyvinyl acetate, polyvinyl carbazole, polyacrylates, etc.; ethylene-vinyl acetate copolymers, etc.

Next, examples of the present invention are mentioned below along with comparative examples, by which the effects of the invention are supported.

EXAMPLE 1

25 g of high-amylose corn starch were suspended in 200 g of DMSO (non-aqueous organic solvent), heated up to 80° C. while stirring and kept 80° C. for 20 minutes, whereupon the starch was gelatinized. 20% of sodium bicarbonate (catalyst) was added thereto, and 12 g of vinyl acetate (vinyl ester) were added thereto still at 80° C.

Then, these were reacted at the temperature for 1 hour. After this, the reaction mixture was poured into city water, triturated and washed while stirring rapidly, to obtain a starch ester precipitate. This was filtered and dried to obtain a starch ester.

EXAMPLE 2

The same process as in Example 1 was repeated, except that 14.0 g of vinyl propionate were used as the vinyl ester in place of vinyl acetate.

EXAMPLE 3

The same process as in Example 1 was repeated, except that 32 g of vinyl laurate were used as the vinyl ester in place of vinyl acetate.

EXAMPLE 4

The same process as in Example 1 was repeated, except that 13.7 g of vinyl acrylate were used as the vinyl ester in place of vinyl acetate.

EXAMPLE 5

The same process as in Example 1 was repeated, except that 19.8 g of vinyl benzoate were used as the vinyl ester in place of vinyl acetate.

EXAMPLE 6

The same process as in Example 1 was repeated, except that 1.4 g of dimethylaminopyridine were used as the catalyst in place of sodium bicarbonate.

EXAMPLE 7

The same process as in Example 1 was repeated, except that the reaction temperature was varied to 20° C., 40° C., 100° C., 120° C., or 150° C.

EXAMPLE 8

This example is basically the same as Example 1 in that the same starch ester is obtained but is different from the latter in that the catalyst was previously infiltrated into the starting starch.

25 g of high-amylose corn starch, 1.5 g of sodium hydroxide and 8.3 g of water were kneaded in a Sigma Blade Kneader for 30 minutes at 30° C. Next, this was gelatinized in the same manner as in Example 1 and 12 g of vinyl acetate were added thereto and reacted for one hour at 80° C. After this, the reaction mixture was treated in the same manner as Example 1 to obtain a starch ester.

EXAMPLE 9

This example is basically the same as Example 1 in that the same starch ester is obtained but is different from the latter in that the vinyl ester was used as the non-aqueous organic solvent.

25 g of high-amylose corn starch and 7.5 g of potassium acetate were suspended in 14 g of vinyl acetate and reacted at 78° C. for 4 hours. After this, the reaction mixture was treated in the same manner as in Example 1 to obtain a starch ester.

EXAMPLE 10

This example is basically the same as Example 1 in that the same starch ester is obtained but is different from the latter in that the catalyst was previously infiltrated into the starting starch and that the vinyl ester was used as the non-aqueous organic solvent.

25 g of high-amylose corn starch, 2.5 g of sodium carbonate and 7.5 g of water were kneaded in a Sigma Blade kneader for 15 minutes at 30° C. Next, the resulting blend was transferred into a reaction flask, to which added were 60 g of vinyl acetate. These were reacted at 75° C. for 2 hours. After this, the reaction mixture was treated in the same manner as in Example 1 to obtain a starch ester.

Comparative Example 1

This is to obtain the same starch ester as in Example 1, in which, however, acetic anhydride was used as the esterifying agent. This is a comparative example to Example 1.

25 g of high-amylose corn starch were suspended in 200 g of DMSO, heated up to 80° C. while stirring and kept at 80° C. for 20 minutes thereby gelatinizing the starch. 39 g of sodium bicarbonate, which is to neutralize the acid produced as the side product, were added thereto and cooled to the reaction temperature of 20° C. Then 48 g of acetic anhydride were added to the reaction system while the reaction temperature was controlled at 20° C. to 25° C. in order to prevent the acidic hydrolysis of the starch. After the addition, the reaction was continued at the temperature for 1 hour. After this, the reaction mixture was treated in the same manner as Example 1 to obtain a starch ester.

Comparative Example 2

The same process was repeated as in Comparative Example 1, except that propionic anhydride was used in place of acetic anhydride. This is a comparative example to Example 2.

Comparative Example 3

The same process was repeated as Comparative Example 1, except that the reaction temperature was varied to 20° C., 40° C., 100° C., 120° C. or 150° C. This is a comparative example to Example 3.

Comparative Example 4

This is to obtain the same starch ester as in Example 1, in which, however, water was used as the reaction solvent. This is a comparative example to Example 1.

25 g of high-amylose corn starch were suspended in city water to prepare a 20% starch slurry. This was made to have a pH of 10 by adding sodium hydroxide thereto. After this, the slurry was heated up to 40° C., 12 g of vinyl acetate were added thereto while maintaining the pH value at 9 to 10 and reacted at the temperature for 1 hour. The reaction mixture became gelatinized and it was difficult to directly subject it to fractionating filtration. Therefore, this poured into about 500 ml of methanol, and the precipitate formed was filtered out and dried.

Comparative Example 5

46 g of high-amylose starch (amylose content: 70%) were put into a one-liter four-neck flask equipped with a reflux condenser, a dropping funnel and a thermometer, and 150 ml of acetic anhydride were added thereto while stirring. Subsequently, this was heated until constant reflux. The boiling temperature was about 125° C. The heating to cause the burning of the solid starch at the bottom of flask must be evaded. After 1 to 2 hours, the viscosity of the reaction mixture was increased, and after 3 to 4 hours, a viscous, brownish transparent mixture was formed. After the necessary reaction time of about 5 hours, from 5 to 10 ml of acetic acid were taken out by distillation at 118° C., and thereafter 20 ml of ethanol were dropwise added to the reaction mixture. This was stirred for further 30 minutes while heated in a somewhat retarded degree, and the solvent mixture comprising the acetate and acetic acid formed by the reaction of ethanol and acetic anhydride was taken out by distillation at 102° to 105° C. Next, the heating was stopped, and the reaction mixture was cooled for 0.5 to 1 hour. Subsequently, 20 ml of ethanol were again dropwise added thereto. After this, about 200 ml of methanol were added thereto to thereby gradually from a precipitate. The thus-formed precipitate was repeatedly washed with alcohol, separated by suction and dried in air.

The starch esters obtained in the above-mentioned examples and comparative examples were subjected to the following tests to evaluate their physical properties with respect to the matters mentioned below. The test results are shown in Table 1. From these, it is known that the products obtained in the examples were superior to those obtained in the comparative examples in terms of all the reaction efficiency (reactivity of the reagent used), the effective utilization of the reagent, the degree of substitution (DS) of the starch esters obtained, and the number average molecular weight of the starch esters. Concretely, it is known that, according to the method of the present invention, the effective utilization of the esterifying agent was 50% or more, the reaction efficiency with the agent was 77% or more, and high-substitution-degree starch esters having DS of 2.0 or more were obtained while preventing the formation of low-molecular starch esters.

(1) Reactivity of reagent: The percentage of the esterifying agent reacted, relative to all the esterifying agent added.

(2) Effective utilization of reagent: The percentage of the part of the esterifying agent that participated in the esterification, relative to the total molecular weight of the agent.

(3) Degree of substitution: This indicates the proportion of the esterified hydroxyl groups of all the 2-, 3- and 6-positioned reactive hydroxyl groups existing in the glucose units in the starting starch. The degree of substitution of 3 means that all the hydroxyl groups were esterified (100%).

(4) Number average molecular weight:

$$Mn = (Hi/((Hi/Mi))$$

where Hi means the concentration of (i) molecules in the liquid, and Mi means the molecular weight of (i) molecules in the liquid. This is one expression to indicate the molecular weight of a starch compound to be measured by gel permeation chromatography (GPC), and this is calculated in accordance with the above-mentioned equation.

Next, the starch esters obtained in the example of the present invention and the comparative example each were blended with a plasticizer or a plasticizer and a resin at various ratios and shaped into test pieces, and the mechanical strength of the test pieces was measured. The relationship between the strength of the test piece and the blending ratio was investigated.

Application Example 1, Comparative Application Example 1

The high-molecular starch esters obtained in Example 1 and Comparative Example 5, both having a degree of substitution of 2.5, each were blended with a plasticizer of triethyl acetylcitrate (ATEC) at various blending ratios indicated in Table 2. The resulting compositions were shaped into test pieces of Application Example 1 and Comparative Application Example 1, and the tensile strength (JIS K 7113, for test pieces of Model No.1) and the flexural strength (JIS K 7203) of the thus-shaped test pieces were measured.

The test results are shown in Table 2, from which it is known that the test pieces of Application Example 1 where the starch ester of Example 1 was used had much higher mechanical strength than those of Comparative Application Example 1 where the starch ester of Comparative Example 5 was used, irrespective of the blending ratios.

Application Example 2, Comparative Application Example 2

The high-molecular starch esters obtained in Example 1 and Comparative Example 1, having a degree of substitution of 2.5 (the former) or 2.1 (the latter), each were blended with a plasticizer of triacetin and a resin of polycaprolactone ("TONE-787", produced by Union Carbide) or cellulose acetate ("Acetate Tenex 0660", produced by Teijin) at various blending ratios indicated in Table 3. The resulting compositions were shaped into test pieces of Application Example 2 and Comparative Application Example 2, and the tensile strength (JIS K 7113, for test pieces of Model No.1) of the thus-shaped test pieces was measured.

The test results are shown in Table 3 and FIGS. 1 and 2, from which it is known that the variation in the mechanical strength of the plasticizer-containing starch ester molding samples of the Application Example 2 of the present invention is above the corresponding proportional straight line L in these figures while that of the samples of the Comparative Application Example 2 gives a polyline graph bent below the corresponding proportional straight line L therein.

Application Example 3, Comparative Application Example 3

The starch esters obtained in Example 1 and Comparative Example 3 (reacted at a reaction temperature of 100(C), having a degree of substitution of 2.5 (the former) or 2.3 (the latter), each were blended with 17.6 parts, relative to the starch, of a plasticizer of triethyl acetylcitrate (ATEC), ethylphthaloylethyl glycolate (EPEG), triacetin (TA) and/or dibutyl phthalate (DBP) along with 30% by weight of a filler of talc. The resulting compositions were shaped into test pieces of Application Example 3 and Comparative Application Example 3, and the flexural modulus (JIS K 7203) and the flexural strength (JIS K 7203) of the thus-shaped test pieces were measured.

The test results are shown in Table 4, from which it is known that the test pieces of Application Example 3 containing a mixed plasticizer have higher mechanical strength than those containing a single plasticizer but such improvement could not be attained in Comparative Application Example 3. This indicates that the starch esters obtained in the examples are different from those obtained in the comparative examples.

[TABLE 1]

|  | Reaction Temperature (°C.) | Reactivity of Reagent (%) | Effective Utilization of Reagent (%) | Degree of Substitution | Number Average Molecular Weight |
|---|---|---|---|---|---|
| Example 1 | — | 95 | 50 | 2.5 | $4.53 \times 10^4$ |
| Example 2 | — | 92 | 57 | 2.3 | $4.31 \times 10^4$ |
| Example 3 | — | 72 | 81 | 1.9 | $5.52 \times 10^4$ |
| Example 4 | — | 79 | 56 | 2.1 | $4.98 \times 10^4$ |
| Example 5 | — | 85 | 81 | 2.1 | $6.51 \times 10^4$ |
| Example 6 | — | 96 | 50 | 2.2 | $4.51 \times 10^4$ |
| Example 7 | 20 | 81 | 50 | 2.1 | $4.44 \times 10^4$ |
|  | 40 | 89 | 50 | 2.3 | $4.66 \times 10^4$ |
|  | 100 | 95 | 50 | 2.5 | $5.54 \times 10^4$ |
|  | 120 | 92 | 50 | 2.5 | $6.11 \times 10^4$ |
|  | 150 | 92 | 50 | 2.5 | $7.72 \times 10^4$ |
| Example 8 | — | 98 | 50 | 2.2 | $4.48 \times 10^4$ |
| Example 9 | — | 95 | 50 | 2.4 | $4.66 \times 10^4$ |
| Example 10 | — | 77 | 50 | 2.3 | $4.58 \times 10^4$ |
| Comparative Example 1 | — | 80 | 42.2 | 2.1 | $3.37 \times 10^4$ |
| Comparative Example 2 | — | 81 | 43.8 | 1.8 | $3.40 \times 10^4$ |
| Comparative Example 3 | 20 | 75 | 42.2 | 1.7 | $3.21 \times 10^4$ |
|  | 40 | 75 | 42.2 | 2.1 | $2.85 \times 10^4$ |
|  | 100 | 82 | 42.2 | 2.3 | $1.99 \times 10^4$ |
|  | 120 | 85 | 42.2 | 2.3 | $1.53 \times 10^4$ |
|  | 150 | 79 | 42.2 | 2.2 | $1.09 \times 10^4$ |
| Comparative Example 4 | — | 67 | 42.2 | 0.8 | $4.24 \times 10^4$ |
| Comparative Example 5 | 125 | 65 | 42.2 | 2.5 | $3.95 \times 10^4$ |
| High-amylose Corn Starch |  |  |  |  | $4.05 \times 10^4$ |

[TABLE 2]

(Tensile Strength, Flexural Strength)

| Data No. | 1 | 2 | 3 |
|---|---|---|---|
| Starch Acetate | 70% | 80% | 90% |
| ATEC | 30% | 20% | 10% |
| Application Example 1 Tensile Strength | 55.9 | 316.6 | 450.6 |
| Application Example 1 Flexural Strength | 110.0 | 539.9 | 749.8 |
| Comparative Application Example 1 Tensile Strength | 24.9 | 193.7 | 275.7 |
| Comparative Application Example 1 Flexural Strength | 63.0 | 324.3 | 450.4 |

*Unit: kgf/cm2

[TABLE 3]

| Data No. | 1 | 2 | 3 | 4 | 5 | 6 | 7 | 8 | 9 |
|---|---|---|---|---|---|---|---|---|---|
| Starch Acetate | 100 | 70 | 60 | 0 | 100 | 75 | 50 | 25 | 0 |
| Cellulose Acetate | 0 | 30 | 40 | 100 |  |  |  |  |  |
| Polycaprolactone |  |  |  |  | 0 | 25 | 50 | 75 | 100 |
| Triacetin | 54 | 54 | 54 | 0 | 11 | 11 | 11 | 11 | 0 |

[TABLE 3]-continued

| Data No. | 1 | 2 | 3 | 4 | 5 | 6 | 7 | 8 | 9 |
|---|---|---|---|---|---|---|---|---|---|
| Application Example 2 Tensile Strength | 11 | 71 | 102 | 218 | 361 | 332 | 228 | 181 | 122 |
| Comparative Application Example 2 Tensile Strength | 3 | 19 | 51 | 218 | 274 | 212 | 104 | 96 | 122 |

*Unit: kgf/cm2

[TABLE 4]

| Single plasticizer used. | | Application Example 3 | Comparative Application Example 3 |
|---|---|---|---|
| Triacetin | Flexural Modulus | 50948 | 49929 |
| (TA) | Flexural Strength | 523 | 460 |
| DBP | Flexural Modulus | 52677 | 51097 |
| | Flexural Strength | 552 | 464 |
| ATEC | Flexural Modulus | 53408 | 51272 |
| | Flexural Strength | 531 | 452 |
| EPEG | Flexural Modulus | 58663 | 56316 |
| | Flexural Strength | 535 | 449 |
| Mixed plasticizer (1/1) used. | | | |
| DBP/TA | Flexural Modulus | 50975 | 50039 |
| | Flexural Strength | 628 | 492 |
| ATEC/TA | Flexural Modulus | 55316 | 51148 |
| | Flexural Strength | 610 | 441 |
| EPEG/TA | Flexural Modulus | 56112 | 54826 |
| | Flexural Strength | 617 | 461 |

We claim:

1. A method of preparing a starch ester having a degree of substitution (d.s.) of at least 1.0 which comprises dissolving or suspending starch in a non-aqueous solvent and reacting it with a vinyl ester having an ester residue of from 2 to 18 carbon atoms at a temperature of from about 30° C. to about 200° C. in the presence of an esterification catalyst which has been combined with the starch before the starch is reacted with the vinyl ester.

2. A method of claim 1 in which the vinyl ester is the non-aqueous solvent.

3. A method of claim 1 wherein the non-aqueous organic solvent is a member selected from the group consisting of:
   (a) an organic solvent which dissolves starch,
   (b) an organic solvent which does not dissolve starch but which dissolves or is compatible with vinyl esters and starch esters, and
   (c) a vinyl ester in liquid form.

4. A method of claim 1 wherein the esterification catalyst is a member selected from the group consisting of:
   (a) an alkaline metal hydroxide;
   (b) a mineral acid salt;
   (c) an organic interlayer transition catalyst; and
   (d) an amino compound.

* * * * *